(No Model.) 3 Sheets—Sheet 1.

G. H. BABCOCK.
ROOFING AND SHEATHING TILE.

No. 430,366. Patented June 17, 1890.

WITNESSES:
H. F. Parker.
Chas. Hanimann.

INVENTOR
George H. Babcock
BY
Chas. W. Forbes
ATTORNEY (No Model.) 3 Sheets—Sheet 2.
G. H. BABCOCK.
ROOFING AND SHEATHING TILE.
No. 430,366. Patented June 17, 1890.
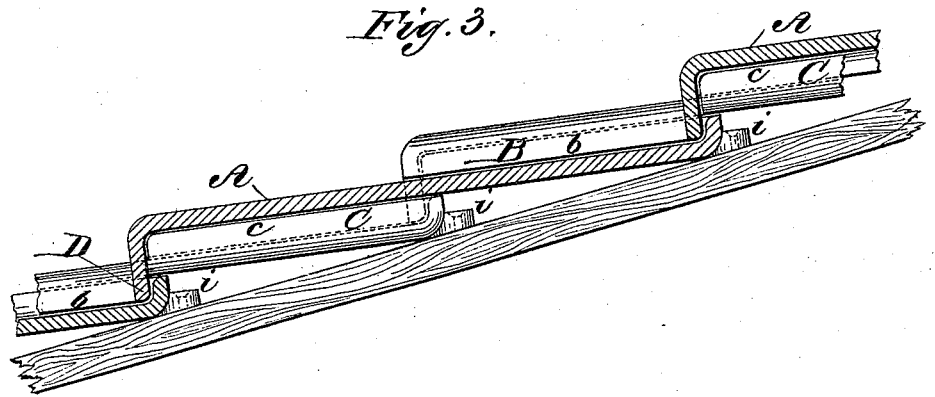
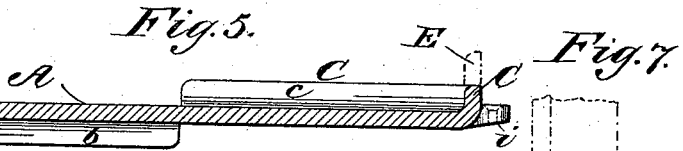
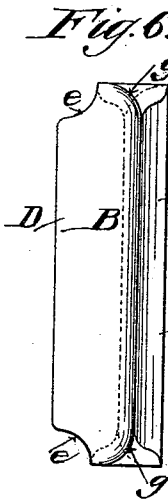
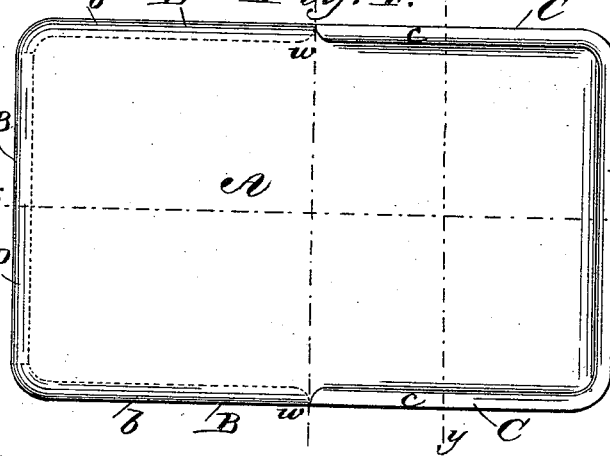
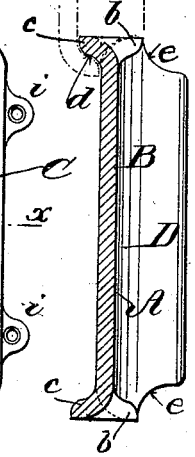
WITNESSES:
H. F. Parker
Chas. Hanimann
INVENTOR
George H. Babcock
BY
Chas. W. Forbes
ATTORNEY

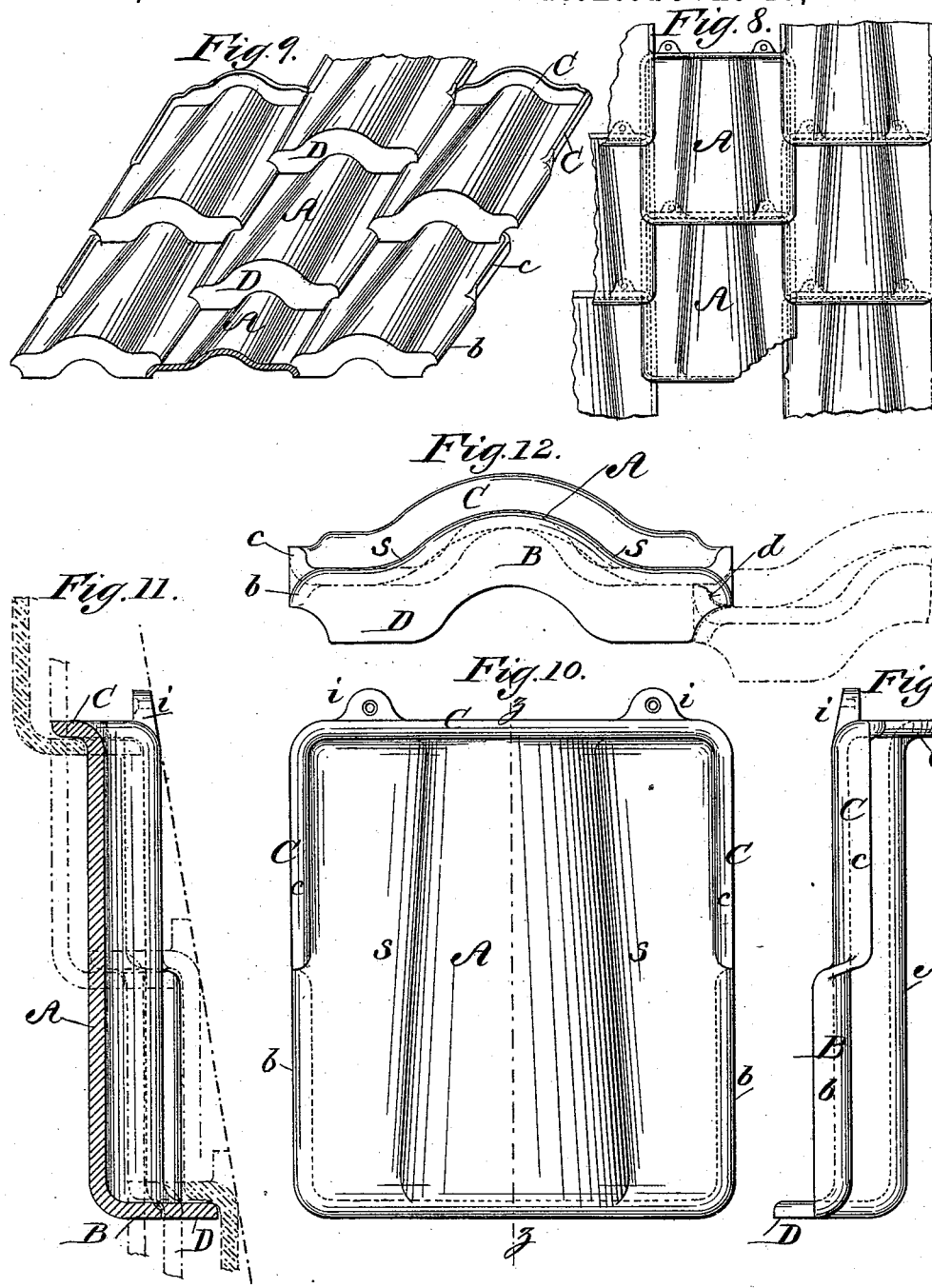

UNITED STATES PATENT OFFICE.

GEORGE H. BABCOCK, OF PLAINFIELD, NEW JERSEY.

ROOFING AND SHEATHING TILE.

SPECIFICATION forming part of Letters Patent No. 430,366, dated June 17, 1890.

Application filed November 13, 1889. Serial No. 330,226. (No model.)

*To all whom it may concern:*

Be it known that I, GEORGE H. BABCOCK, a citizen of the United States, residing at Plainfield, in the county of Union and State of New Jersey, have invented certain new and useful Improvements in Roofing and Sheathing Tiles, of which the following is a specification, reference being had to the accompanying drawings, in which—

Figure 1:
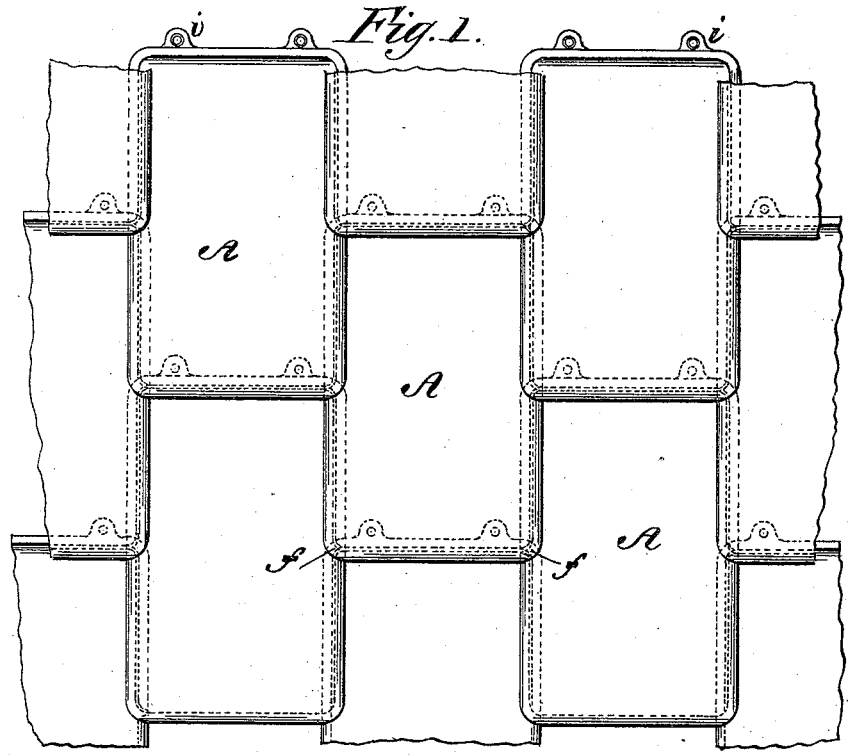
Figure 2:
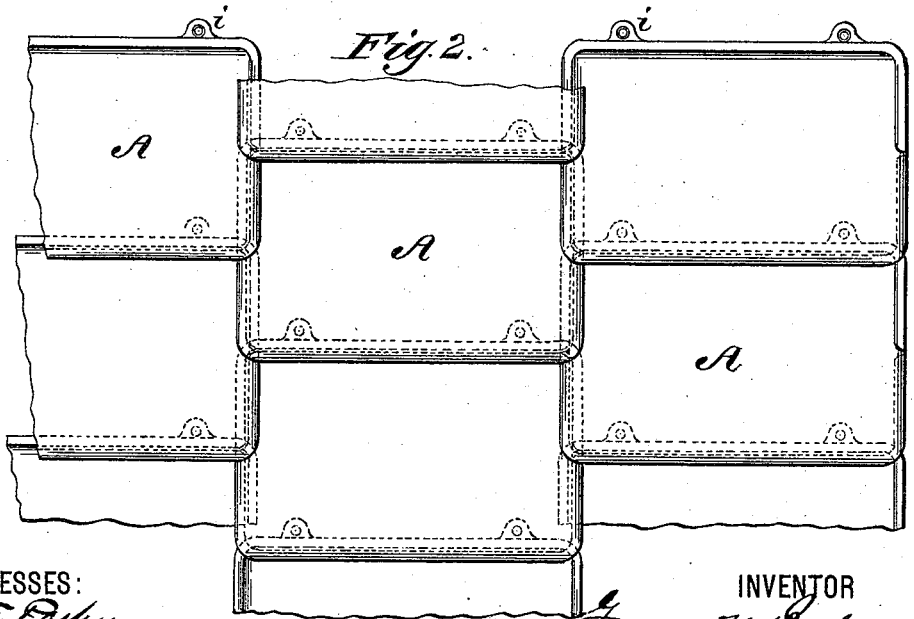

Figure 1 is a plan view of several tiles embodying my invention arranged as they would be when laid upon a roof; Fig. 2, a plan view showing tiles of similar character in modified proportions; Fig. 3, an enlarged vertical section taken on a line corresponding with $x\ x$, Fig. 4, of the tiles as combined in Figs. 1 or 2; Fig. 4, a plan view of a single tile, drawn on the same scale as Fig. 3; Fig. 5, a sectional view $x\ x$ of Fig. 4; Fig. 6, an elevation of the lower end of the tile in Fig. 4; and Fig. 7, a cross-section $y\ y$ of Fig. 4, looking toward the lower end of the tile. Fig. 8 is a plan view similar to Fig. 1, showing a feature of configuring the surface of the tiles, the interlocking parts remaining the same in construction; Fig. 9, a perspective view of Fig. 8; Fig. 10, an enlarged plan view of a single tile similar to those composing Figs. 8 and 9; Fig. 11, a section $z\ z$ of Fig. 10, indicating the relative positions of adjacent interlocking tiles and their relative angle to the roof; Fig. 12, an elevation of the lower end of Fig. 10, and Fig. 13 a side elevation thereof.

This invention relates to clay or other roofing tiles of approximately rectangular form; and the novelty consists in interlocking the tiles consecutively in vertical succession, composing series which lie in lines perpendicular, or substantially so, to the eave or the ridge of the roof, and then "breaking" or alternating joints between the adjacent series laterally, so that the members of each overlap at or about the middle of those adjacent.

The invention also includes certain novel features of construction of the interlocking flanges used in carrying out the said arrangement and forming tight joints for the exclusion of rain, wind, or dust.

The invention also consists in applying to such tile surfaces composing half-frustums of cones which overlap in lateral alternation, as above described.

In Figs. 1 to 7, inclusive, I have illustrated tiles having a plane surface A.

B is a downward flange on the lower side of the tile extending about one-half of its perimeter below its axial line $w\ w$, Fig. 4.

C is an upward flange on the upper side of the tile extending about one-half of its perimeter above its axial lines $w\ w$.

D is a part of the flange upon one side or end of the tile deeper than those on the remaining sides. The deepening of the flange may be applied at one or both of opposite ends, as indicated by dotted lines at E, both projections D and E being substantially similar. The extension in depth of the flange at D compensates for the difference in distance or separation between the planes of adjacent tiles of common series and adjacent tiles of different series, enabling them to interlock in vertical as well as lateral succession. This is necessary, also, in order to close the horizontal joints. The said joints may be the more securely closed by the employment of the upward-extended flange E in conjunction with the downward extension D, as aforesaid.

The parts $b\ b\ c\ c$ of the flanges B C respectively interlock, as indicated at $d$, Figs. 7 and 12. The downward flange below the axial line is thereby adapted to overlap and interlock three adjacent tiles, and the upward flange above the axial line to interlock three other overlapping tiles. The junctions of the corners with the sides at $f$, Fig. 1, where the flanges B C reverse, are sealed by means of the curved edges $e$ of the extended flange D, which overlap and fit the rounded exteriors $g$, Fig. 6, of adjacent tiles.

In Figs. 9 to 13, inclusive, the major portion of the surface A corresponds to the half-frustum of a cone or conic segment, the convex curvature being graduated off at the sides to join the normal surface $s\ s$. The edges of the flanges at the ends of the tile are curved correspondingly to the surface A to fit the same, as represented at D, Fig. 9, the construction being in other respects similar to the previous illustrations.

$i\ i$ in the several figures indicate fastening-lugs, by which the tiles may be secured to the substructure.

A resulting feature of the present invention consists in heightening the ornamental effect of the roofing by the high relief or "reveal" obtained, the separation of the planes of vertically-adjacent tiles being doubled by the interposition of the edges of laterally-adjacent tiles between their ends.

I claim as my invention and desire to secure by Letters Patent—

1. A tile of approximately rectangular form, having a downward flange extending about one-half its perimeter below its axial line and an upward flange above its axial line extending the remainder of its perimeter, substantially as herein shown.

2. A tile of substantially the character described, having a flange at its two sides above and below its axial line deeper than those on the other two sides.

3. A tile with downward flanges below its axial line, adapted to overlap and interlock three adjacent tiles, and upward flanges above its axial line, adapted to interlock three other overlapping tiles, substantially as shown.

4. In roofing-tiles, two or more vertical series of overlapping conical segments, in which each series overlap at or about the middle of the lengths of the adjacent series, substantially as shown.

GEO. H. BABCOCK.

Witnesses:
CHAS. W. FORBES,
AUG. CREVELING.